(12) United States Patent
Li et al.

(10) Patent No.: US 9,980,324 B2
(45) Date of Patent: May 22, 2018

(54) METHOD AND APPARATUS FOR CONTROLLING THE HEATING OF FOOD INGREDIENTS

(71) Applicant: KONINKLIJKE PHILIPS N.V., Eindhoven (NL)

(72) Inventors: Wei Li, Eindhoven (NL); Guangwei Wang, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 0 days. days.

(21) Appl. No.: 15/110,152

(22) PCT Filed: Dec. 15, 2015

(86) PCT No.: PCT/EP2015/079892
§ 371 (c)(1),
(2) Date: Jul. 7, 2016

(87) PCT Pub. No.: WO2016/096922
PCT Pub. Date: Jun. 23, 2016

(65) Prior Publication Data
US 2017/0280517 A1    Sep. 28, 2017

(30) Foreign Application Priority Data

Dec. 17, 2014  (CN) .................. PCT/CN2014/001137
Mar. 20, 2015  (EP) ..................................... 15160001

(51) Int. Cl.
*H05B 6/68*    (2006.01)
*H05B 6/64*    (2006.01)
(Continued)

(52) U.S. Cl.
CPC ................ *H05B 6/687* (2013.01); *A23L 3/01* (2013.01); *A23L 5/15* (2016.08); *A23L 5/34* (2016.08);
(Continued)

(58) Field of Classification Search
CPC ....... A23L 3/01; A23L 5/15; A23L 5/34–5/36; H05B 6/6467; H05B 6/68; H05B 6/687;
(Continued)

(56) References Cited

U.S. PATENT DOCUMENTS 5,266,766 A    11/1993  Hecox
8,330,085 B2   12/2012  Ishizaki
(Continued)

FOREIGN PATENT DOCUMENTS

EP    2434837 A1    3/2012
JP    0831568 A     2/1996
(Continued)

OTHER PUBLICATIONS

I Hamm, R. (1966). Heating of muscle systems. In E J. Briskey, R. G. Cassens, & J. C. Trautman (Eds.), The physiology and biochemistry of muscle as a food (p. 363). Madison: University of Wisconsin Press.

*Primary Examiner* — Drew E Becker

(57) ABSTRACT

The invention relates to a method (100) and apparatus for controlling the heating of food ingredients. The method comprises the step of measuring (110) the spectrum of energy absorption of the food ingredients in a given range of radio frequencies. The method also comprises the step of identifying (120), in said given range of radio frequencies, the radio frequency for which the food ingredients have the maximum energy absorption. The method also comprises the step of applying (130) an electrical field to the food ingredients, said electrical field having a radio frequency corresponding to said radio frequency for which the food ingredients have the maximum energy absorption. The step of measuring (110) comprises, for a plurality of selected radio frequencies in said given range of radio frequencies, the steps of: applying an electrical field on the food ingredients having a radio frequency corresponding to a given selected radio frequency in said plurality of selected radio
(Continued)

frequencies; and, measuring the ratio between the energy of the radio frequency electrical field reflected or absorbed from the food ingredients, and the energy of the radio frequency electrical field applied to the food ingredients. The plurality of selected radio frequencies are selected from said given range of radio frequencies by the steps of: for each of said given range of radio frequencies, obtaining a penetration depth of an electrical field having a radio frequency corresponding to the given radio frequency into the food ingredients, and including the given radio frequency into the plurality of selected radio frequencies if the penetration depth of the electrical field having a radio frequency corresponding to the given radio frequency is equal to or larger than the thickness of the food ingredients in the direction of the electrical field applied to the food ingredients. This invention allows reducing the heating time of food ingredients.

9 Claims, 8 Drawing Sheets

(51) Int. Cl.
  *A23L 5/30* (2016.01)
  *A23L 3/01* (2006.01)
  *A23L 5/10* (2016.01)
  *H05B 6/70* (2006.01)
(52) U.S. Cl.
  CPC ............. *A23L 5/36* (2016.08); *H05B 6/6467* (2013.01); *H05B 6/688* (2013.01); *H05B 6/705* (2013.01); *Y02B 40/143* (2013.01); *Y02B 40/146* (2013.01)

(58) Field of Classification Search
  CPC ................... H05B 6/688; H05B 6/705; Y02B 40/14–40/146
  USPC .......... 426/231–233, 241–243; 219/709, 750
  See application file for complete search history.

(56) References Cited

U.S. PATENT DOCUMENTS

| | | | |
|---|---|---|---|
| 2008/0029509 A1 | 2/2008 | Rosenbloom | |
| 2009/0057302 A1 | 3/2009 | Ben-Shmuel | |
| 2009/0321427 A1* | 12/2009 | Hyde ................... | H05B 6/6455 219/702 |
| 2010/0187224 A1* | 7/2010 | Hyde ..................... | H05B 6/705 219/720 |
| 2013/0142923 A1* | 6/2013 | Torres .................... | H05B 6/705 426/233 |
| 2013/0168388 A1* | 7/2013 | Moon .................... | H05B 6/705 219/702 |
| 2016/0330803 A1* | 11/2016 | Guatta ................... | H05B 6/686 |
| 2017/0290105 A1* | 10/2017 | Gambato ............. | H05B 1/0263 |
| 2017/0336200 A1* | 11/2017 | Li .......................... | G01B 15/04 |
| 2018/0007922 A1* | 1/2018 | Torngren ............... | A23B 4/012 |

FOREIGN PATENT DOCUMENTS

| | | |
|---|---|---|
| JP | 2001161833 A | 6/2001 |
| KR | 0161026 B1 | 12/1998 |
| TW | 423977 U | 3/2012 |

\* cited by examiner

METHOD AND APPARATUS FOR CONTROLLING THE HEATING OF FOOD INGREDIENTS

This application is the U.S. National Phase application under 35 U.S.C. § 371 of International Application No. PCT/EP2015/079892, filed on Dec. 15, 2015, which claims the benefit of International Application No. PCT/CN2014/001137 filed on Dec. 17, 2014 and International Application 15160001.2 filed on Mar. 20, 2015. These applications are hereby incorporated by reference herein.

FIELD OF THE INVENTION

The present technology relates to the field of heating control, particularly to a method for controlling the heating of food ingredients.

The technology also relates to an apparatus, a cooking device and a computer readable storage medium for performing the method.

BACKGROUND OF THE INVENTION

Microwave heating is a well-developed technology, and microwave oven is a kind of popular heating appliance. Microwave oven heats food by irradiating in the cooking chamber of the oven, an electromagnetic radiation in the microwave spectrum and causes polar molecules (e.g. water) in the food to rotate and build up thermal energy in a process known as the dielectric heating. A traditional microwave oven uses 2.45 GHz as a fixed working frequency. Also known microwave ovens using multiple fixed frequencies via the use of high-power traveling wave tubes, the multiple frequencies are determined manually by user.

However, it appears that the fixed heating frequency used in known microwave ovens is not an optimal choice in terms of heating.

US2013142923A1 discloses a method of processing objects by radio frequency (RF) energy. The method comprises heating the object by applying radio frequency energy, monitoring a value related to a rate of absorption of RF energy by the object during the heating, and adjusting the RF energy in accordance with changes in a time derivative of the monitored value. However, this known method also does not always achieve an optimal heating of the food ingredients.

EP2434837A1 discloses a microwave heating device that is configured to prevent a microwave generating part from being destroyed by reflected power. The microwave heating device comprises a control part that executes a frequency sweep operation of a prescribed frequency band to set an oscillation frequency at which the minimum reflected power becomes minimum and to control the oscillation frequency of an oscillator part and the output of a power amplifier part.

US2009057302A1 discloses heating a load such as food in a resonant cavity by RF radiation. The RF feed sweeps over a plurality of frequencies, determining at each frequency the absorption of the radiation energy. The food is then radiated at frequencies that optimize heating goals, for example, corresponding to the most efficient absorption frequencies to achieve faster heating.

SUMMARY OF THE INVENTION

It is an object of the present disclosure to solve or alleviate at least one of the problems mentioned above.

The object of the present invention is solved by the subject-matter of the independent claims, wherein further embodiments are incorporated in the dependent claims.

A first aspect of the present disclosure relates to a method of controlling the heating of food ingredients. The method comprises measuring the spectrum of energy absorption of the food ingredients in a given range of radio frequencies; identifying, in the given range of radio frequencies, the radio frequency for which the food ingredients have the maximum energy absorption; and applying an electrical field to the food ingredients. The electrical field has a radio frequency corresponding to the radio frequency for which the food ingredients have the maximum energy absorption. The step of measuring comprises, for a plurality of selected radio frequencies in said given range of radio frequencies, the steps of: applying an electrical field on the food ingredients having a radio frequency corresponding to a given selected radio frequency in said plurality of selected radio frequencies; and, measuring the ratio between the energy of the radio frequency electrical field reflected or absorbed from the food ingredients, and the energy of the radio frequency electrical field applied to the food ingredients. The plurality of selected radio frequencies are selected from said given range of radio frequencies by the steps of: for each of said given range of radio frequencies, obtaining a penetration depth of an electrical field having a radio frequency corresponding to the given radio frequency into the food ingredients; and, including the given radio frequency into the plurality of selected radio frequencies if the penetration depth of the electrical field having a radio frequency corresponding to the given radio frequency is equal to or larger than the thickness of the food ingredients in the direction of the electrical field applied to the food ingredients.

By taking into account the energy absorption of the food ingredients for the radio frequency in the course of heating the food ingredients, the radio frequency for which the food ingredients have the maximum energy absorption is used to heat the food. In this way, the heating efficiency is improved, thereby reducing the heating time.

Preferably, the method sequentially repeats the above steps until a given heating duration is elapsed. During heating, the temperature of the food ingredients increases. For different temperatures of the food ingredients, the maximum energy absorption of the food ingredients occurs at different radio frequencies. Through dynamically adjusting the heating radio frequency during heating the food ingredients, the whole heating process is heating food ingredients with the highest heating efficiency.

A second aspect of the present disclosure relates to an apparatus configured to control the heating of food ingredients. The apparatus comprises a first unit, a second unit and a third unit. The first unit is adapted to measure the spectrum of energy absorption of the food ingredients in a given range of radio frequencies. The second unit is adapted to identify, in the given range of radio frequencies, the radio frequency for which the food ingredients have the maximum energy absorption. The third unit is adapted to apply an electrical field to the food ingredients, and the electrical field has a radio frequency corresponding to said radio frequency for which the food ingredients have the maximum energy absorption. The first unit is further adapted, for a plurality of selected radio frequencies in said given range of radio frequencies, to: apply an electrical field on the food ingredients having a radio frequency corresponding to a given selected radio frequency in said plurality of selected radio frequencies; and, measure the ratio between the energy of the radio frequency electrical field reflected or absorbed from the food ingredients, and the energy of the radio frequency electrical field applied to the food ingredients. The first unit is further adapted to select the plurality of radio frequencies from said given range of radio frequencies by: for each of said given range of radio frequencies, obtaining a penetration depth of an electrical field having a radio frequency corresponding to the given radio frequency into the food ingredients, and including the given radio frequency into the plurality of selected radio frequencies if the penetration depth of the electrical field having a radio frequency corresponding to the given radio frequency is equal to or larger than the thickness of the food ingredients in the direction of the electrical field applied to the food ingredients.

A third aspect of the present disclosure relates to a method of controlling the heating of food ingredients. The method comprises measuring the spectrum of energy absorption of the food ingredients in a given range of radio frequencies; identifying, in the given range of radio frequencies, the radio frequency for which the food ingredients have the maximum energy absorption; and applying an electrical field to the food ingredients. The electrical field has a radio frequency corresponding to the radio frequency for which the food ingredients have the maximum energy absorption. The step of measuring comprises, for a plurality of selected radio frequencies in said given range of radio frequencies, the steps of: applying an electrical field on the food ingredients having a radio frequency corresponding to a given selected radio frequency in said plurality of selected radio frequencies; and, measuring the ratio between the energy of the radio frequency electrical field reflected or absorbed from the food ingredients, and the energy of the radio frequency electrical field applied to the food ingredients. The plurality of selected radio frequencies are selected from said given range of radio frequencies based on the type of food ingredients. In one such embodiment, the plurality of selected radio frequencies are selected from said given range of radio frequencies based on the type of food ingredients by: applying an electrical field to the food ingredients at a radio frequency in said given range of radio frequencies; measuring the ratio between the energy of the electrical field reflected from the food ingredients and the energy of the electrical field applied to the food ingredients at said radio frequency; and, selecting the plurality of radio frequencies from said given range of radio frequencies based on said ratio between the energy of the electrical field reflected from the food ingredients and the energy of the electrical field applied to the food ingredients at said radio frequency.

A fourth aspect of the present disclosure relates to an apparatus configured to control the heating of food ingredients. The apparatus comprises a first unit, a second unit and a third unit. The first unit is adapted to measure the spectrum of energy absorption of the food ingredients in a given range of radio frequencies. The second unit is adapted to identify, in the given range of radio frequencies, the radio frequency for which the food ingredients have the maximum energy absorption. The third unit is adapted to apply an electrical field to the food ingredients, and the electrical field has a radio frequency corresponding to said radio frequency for which the food ingredients have the maximum energy absorption. The first unit is further adapted, for a plurality of selected radio frequencies in said given range of radio frequencies, to: apply an electrical field on the food ingredients having a radio frequency corresponding to a given selected radio frequency in said plurality of selected radio frequencies; and, measure the ratio between the energy of the radio frequency electrical field reflected or absorbed from the food ingredients, and the energy of the radio frequency electrical field applied to the food ingredients. The first unit is further adapted to select the plurality of radio frequencies from said given range of radio frequencies based on the type of food ingredients. In one embodiment, the first unit is adapted to select the plurality of radio frequencies from said given range of radio frequencies based on the type of food ingredients by: applying an electrical field to the food ingredients at a radio frequency in said given range of radio frequencies; measuring the ratio between the energy of the electrical field reflected from the food ingredients and the energy of the electrical field applied to the food ingredients at said radio frequency; and, selecting the plurality of radio frequencies from said given range of radio frequencies based on said ratio between the energy of the electrical field reflected from the food ingredients and the energy of the electrical field applied to the food ingredients at said radio frequency.

A fifth aspect of the present disclosure is a cooking device. The cooking device comprises an apparatus configured to control the heating of food ingredients as described above.

A sixth aspect of the present disclosure is a computer readable storage medium storing instructions. When executed on an apparatus, the instructions cause the apparatus to perform the steps of the method as described above.

BRIEF DESCRIPTION OF THE DRAWINGS

The technology will now be described, by way of example, based on embodiments with reference to the accompanying drawings, wherein.

DETAILED DESCRIPTION OF EMBODIMENTS

Figure 1:
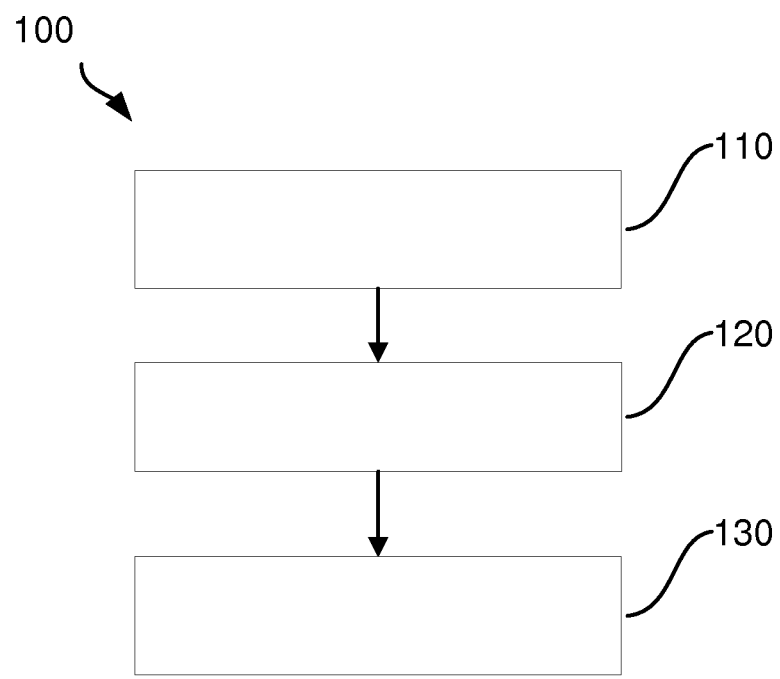
FIG. 1 illustrates a flowchart of a method of controlling the heating of food ingredients in accordance with an embodiment.

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, can be implemented by computer program instructions. These computer program instructions can be provided to a processor, controller, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology can be embodied in hardware and/or in software (including firmware, resident software, micro-code, etc.). Furthermore, the present technology can take the form of a computer program on a computer-usable or computer-readable storage medium having computer-usable or computer-readable program code embodied in the medium for use by or in connection with an instruction execution system. In the context of this document, a computer-usable or computer-readable storage medium can be any medium that can contain, store, or is adapted to communicate the program for use by or in connection with the instruction execution system, apparatus, or device.

Embodiments herein will be described below with reference to the drawings.

FIG. 1 illustrates a flowchart of a method 100 of controlling the heating of food ingredients in accordance with an embodiment.

The method comprises a step of measuring 110 the spectrum of energy absorption of the food ingredients in a given range of radio frequencies. Herein, the range of radio frequency extends from 3 kHz to 100 GHz. The food ingredients may be any kind of food that is capable of absorbing the radio frequency energy. For example, food ingredients correspond to any kind of edible food, such as meat or vegetable.

The method also comprises a step of identifying 120, in the given range of radio frequencies, the radio frequency for which the food ingredients have the maximum energy absorption.

The method also comprises a step of applying 130 an electrical field to the food ingredients. The electrical field has a radio frequency corresponding to said radio frequency for which the food ingredients have the maximum energy absorption. This radio frequency is so-called "heating radio frequency". The heating radio frequency is the radio frequency for which the food ingredients have the maximum energy absorption.

By taking into account the energy absorption of the food ingredients for the radio frequency in the course of heating the food ingredients, the radio frequency for which the food ingredients have the maximum energy absorption is used to heat the food. In this way, the heating efficiency is improved, thereby reducing the heating time.

Figure 2:
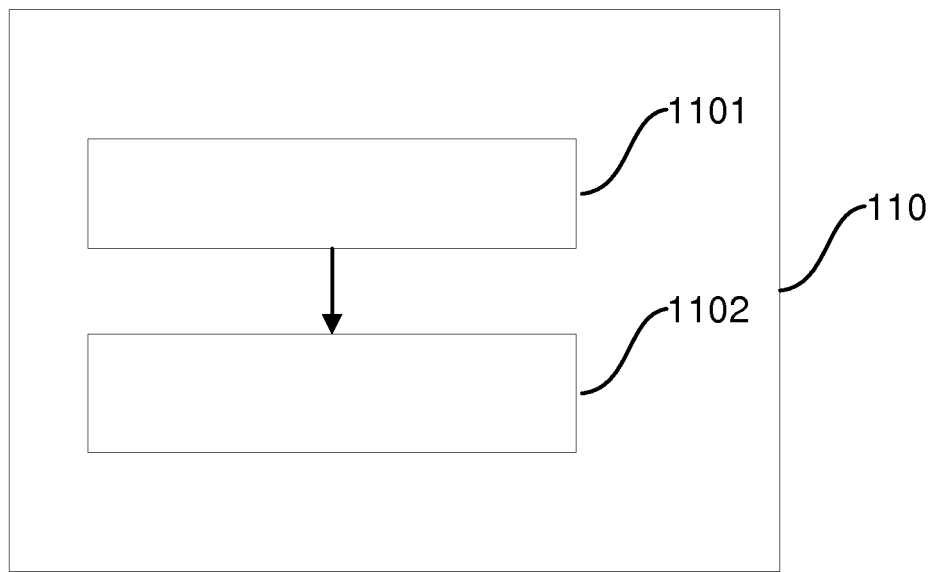
FIG. 2 illustrates a flowchart of a method of controlling the heating of food ingredients in accordance with an embodiment.

Preferably, as illustrated in the flow chart of FIG. 2, the step of measuring 110 comprises, for a plurality of selected radio frequencies in the given range of radio frequencies, a step of applying 1101 an electrical field on the food ingredients. The electrical field has a radio frequency corresponding to one of the plurality of selected radio frequencies. The plurality of selected radio frequencies are either continuous or discrete. The step of measuring 110 also comprises a step of measuring 1102 the ratio between the signal of the radio frequency electrical field reflected from the food ingredients, and the signal of the radio frequency electrical field applied to the food ingredients. If the magnitude of the ratio is larger, it means that more energy of the radio frequency electrical field is reflected from the food ingredients, thus less energy is absorbed by the food ingredients.

The ratio is for example quantified by scattering parameter, such as, but not limited to $S_{11}$. In this case, the signal of the radio frequency electrical field reflected from the food ingredients is, for example, represented by the phase and amplitude of the electrical field reflected from the food ingredients. Similarly, the signal of the radio frequency electrical field applied to the food ingredients is, for example, represented by the phase and amplitude of the electrical field applied to the food ingredients. Alternatively, the energy of the electrical field is represented by the amplitude of the electrical field without the phase of the electrical field.

Figure 3:
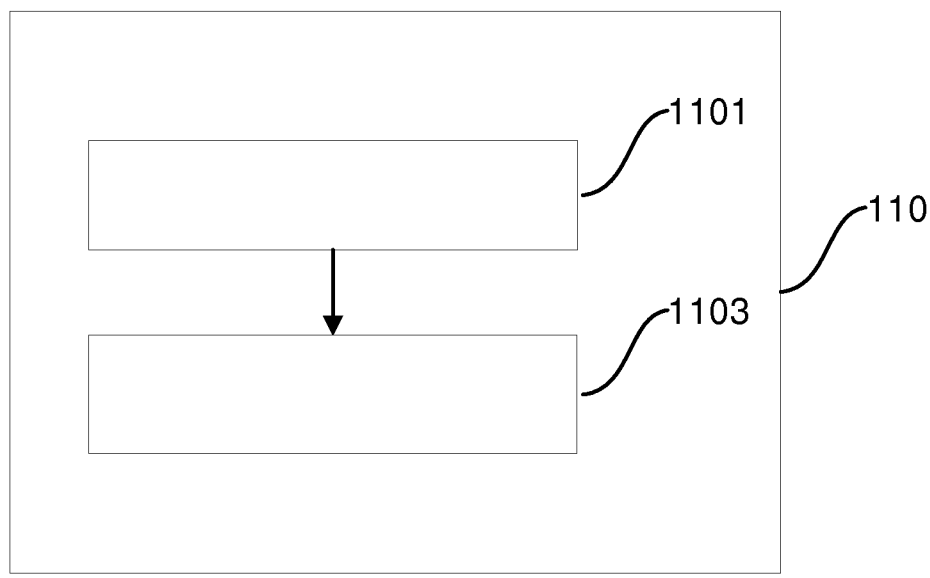
FIG. 3 illustrates a flowchart of a method of controlling the heating of food ingredients in accordance with an embodiment.

Preferably, as illustrated in the flow chart of FIG. 3, the step of measuring 110 comprises, for a plurality of selected radio frequencies in the given range of radio frequencies, a step of applying 1101 an electrical field on the food ingredients and a step of measuring 1103 the ratio between the energy of the radio frequency electrical field absorbed by the food ingredients and the energy of the radio frequency electrical field applied to the food ingredients. The ratio is for example quantified by scattering parameter, such as, but not limited, to $S_{11}$. In this case, the energy of the radio frequency electrical field absorbed by the food ingredients is, for example, equal to the energy of the radio frequency electrical field applied to the food ingredients minus the energy of the radio frequency electrical field reflected from the food ingredients. Hence, a larger ratio indicates that more energy is absorbed by the food ingredients.

It should be appreciated that the above measuring the spectrum of energy absorption of the food ingredients is described by way of example and other suitable ways to measure the spectrum of energy absorption of the food ingredients are applicable to the present disclosure.

Preferably, the step of identifying 120 comprises a step of selecting, among a set of predefined radio frequencies, a radio frequency being closest to the radio frequency for which the food ingredients have the maximum energy absorption. For example, the predefined radio frequencies may correspond to authorized frequencies by a given Administration, Authority, or Standard. Also, the step of applying 130 comprises applying an electrical field having a radio frequency corresponding to the selected predefined radio frequency for heating the food ingredients.

Figure 4:
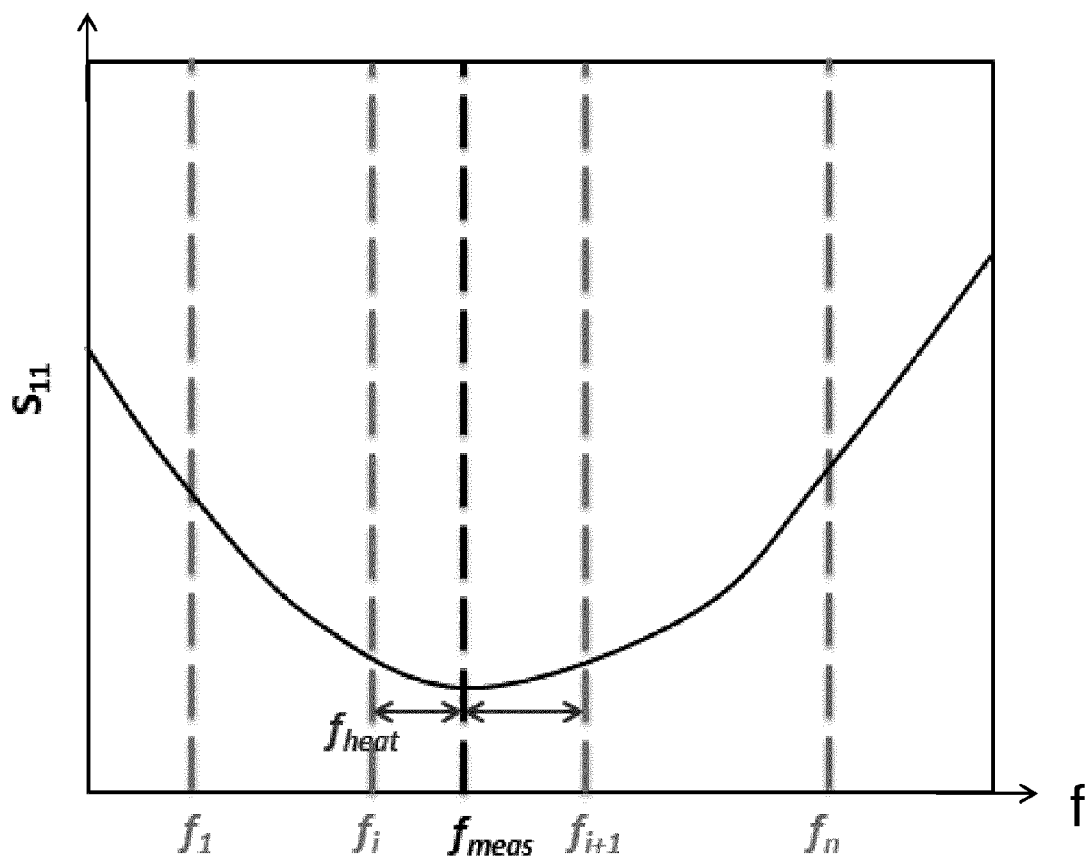
FIG. 4 illustrates an example of the variation of the energy absorption of food ingredients depending on the radio frequency applied.

FIG. 4 illustrates an example of the variation of the energy absorption of food ingredients depending on the radio frequency f applied. The radio frequency $f_{meas}$, called centre frequency, has the minimum $S_{11}$ value with respect to the food ingredients. The centre frequency is the radio frequency for which the food ingredients have the maximum energy absorption. Meanwhile, there is a set of predefined radio frequencies $f_1 \ldots f_i, f_{i+1} \ldots f_n$. Among the set of predefined radio frequencies, $f_i$ is closest to the radio frequency $f_{meas}$ as illustrated. In this case, the radio frequency $f_i$ will be the heating frequency; therefore the method applies the electrical field having the radio frequency $f_i$ to the food ingredients.

Preferably, with the increasing temperature of the food ingredients in the heating process, the radio frequency for which the food ingredients have the maximum energy absorption will shift due to the component status changes in the food ingredients.

Figure 5:
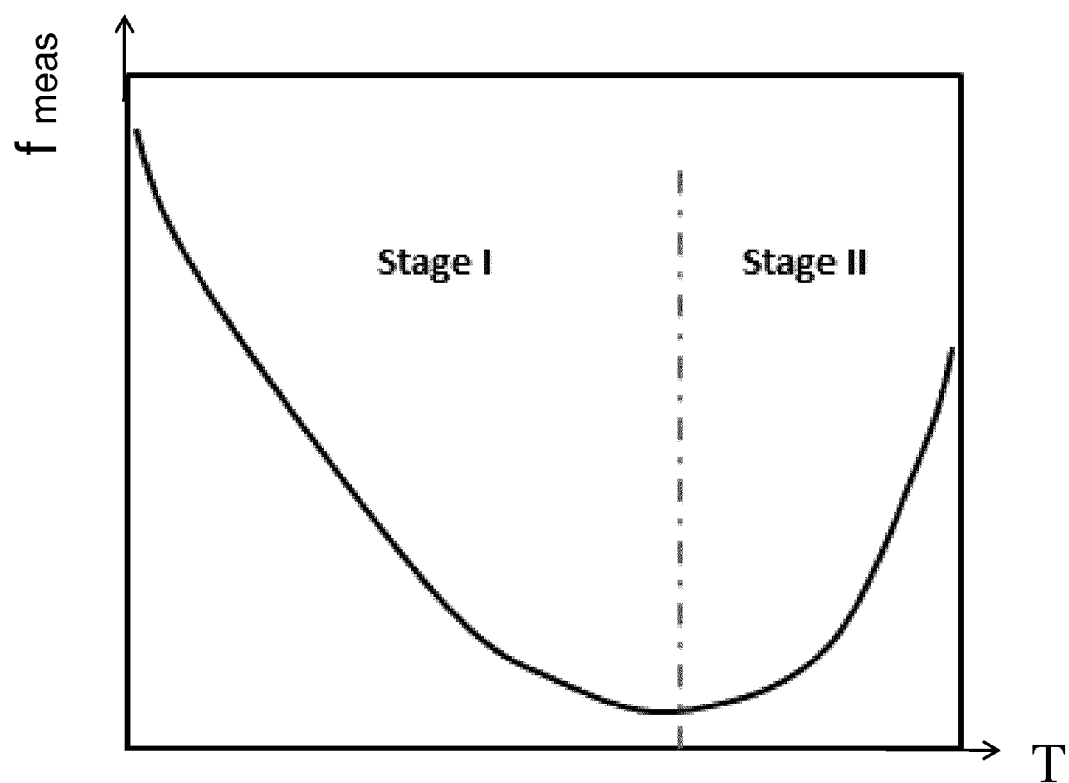
FIG. 5 illustrates an example of the variation of the centre frequency of energy absorption depending on the temperature.

FIG. 5 illustrates an example of the variation of the centre frequency of energy absorption depending on the temperature T. As illustrated, taking the beef steak cooking as an example, when the beef steak is heated, the proteins in the beef steak begin to denature (stage I) leading to the exposure of their hydrophobic cores. In this case, the bigger molecules are formed due to hydrophobic combination among denatured proteins. As a result, the centre frequency of maximum energy absorption shifts to a lower end because the bigger molecule causes peak energy absorption at a lower frequency. After the denaturation (stage II), the centre frequency of maximum energy absorption shifts to a higher end, because the viscosity effect against dipole rotation is reduced with the increasing temperature in the food ingredients. In this case, in order to heat the food ingredients with the highest heating efficiency in the whole heating process, it is desirable to dynamically adjust the heating radio frequency of the food ingredients.

To this end, the dynamic adjustment is implemented by sequentially repeat the following the steps of measuring (110), identifying (120), and applying (130).

The plurality of selected radio frequencies from the given range of radio frequencies, are selected, for example, based on the type of food ingredients. The food heating results from the food dielectric behavior which is dominated by several dielectric mechanisms. In low frequencies from 3 kHz to 300 MHz, ionic conduction is the main mechanism. In high frequencies from 300 MHz to 100 GHz, dipole orientation (mainly induced by water in food) contributes more. Hence, if the food ingredients are rich in electrolytes such as acid and salt, it is advantageous to select the radio frequencies from the low frequencies from 3 kHz to 300 MHz, otherwise from the high frequencies from 300 MHz to 100 GHz. Generally, the amount of electrolytes in the food ingredients is inversely proportional to the magnitude of $S_{11}$ of the food ingredients at low frequency. For example, if the $|S_{11}|$ of the food ingredients at low frequency is less than 0.5, it can be determined that the food ingredients is rich in the electrolytes, and thus the radio frequencies should be selected from the low range of frequencies.

Figure 6:
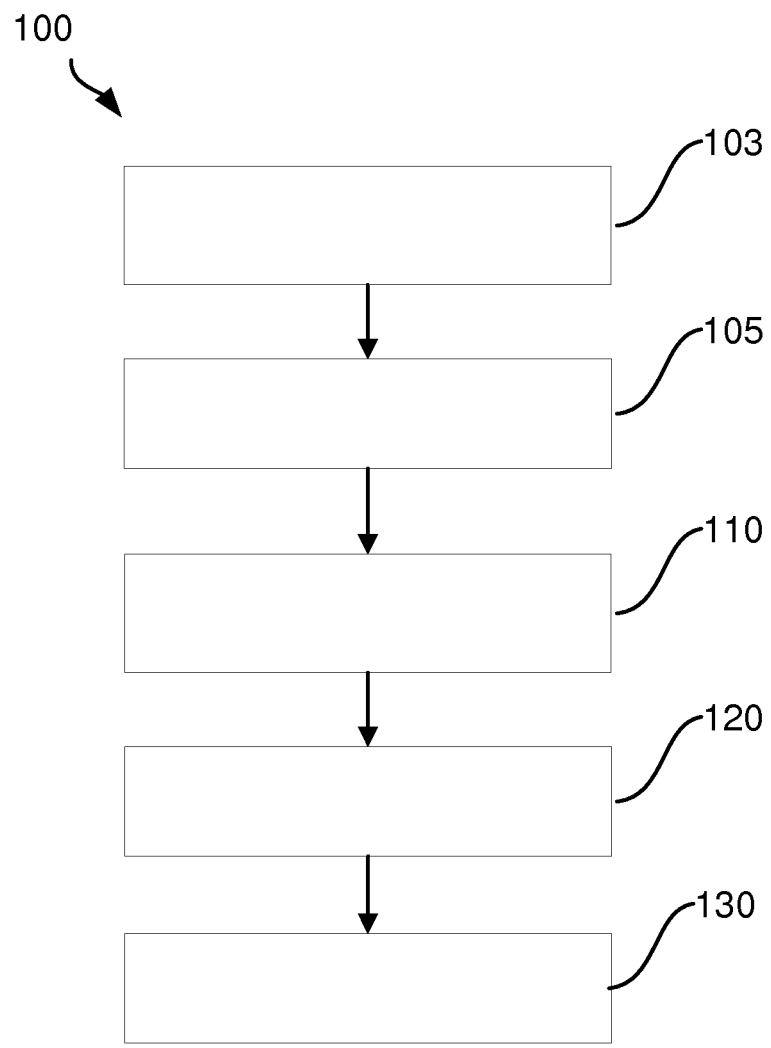
FIG. 6 illustrates a flowchart of a method of controlling the heating of food ingredients in accordance with an embodiment.
Figure 7:
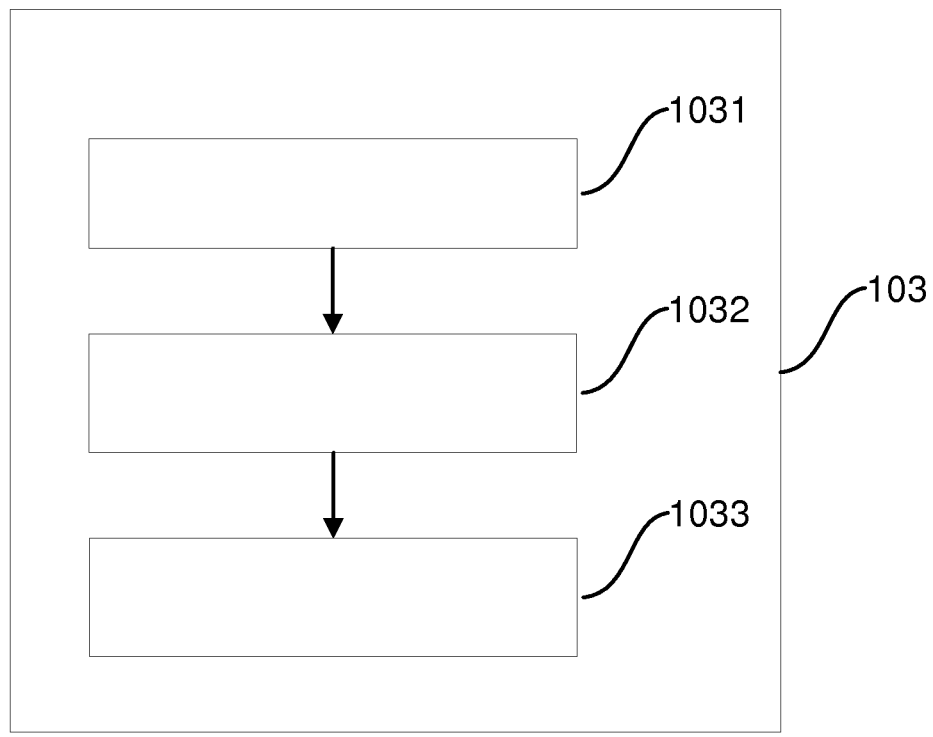
FIG. 7 illustrates a flowchart of a method of controlling the heating of food ingredients in accordance with an embodiment.

As illustrated by the flow chart of FIG. 6, the plurality of selected radio frequencies are selected from the given range of radio frequencies by following steps:

for each of the given range of radio frequencies, obtaining 103 a penetration depth of an electrical field having a radio frequency corresponding to the given radio frequency into the food ingredients. For example, as illustrated in FIG. 7, the step 1031 applies an electrical field on the food ingredients having a radio frequency corresponding to the given radio frequency, and step 1032 measures the ratio between the energy of the electrical field reflected from the food ingredients, and the energy of the electrical field applied to the food ingredients. The ratio is measured in the way described above and will not be repeated here for brevity. Subsequently, the step 1033 derives the penetration depth of the given radio frequency into the food ingredients from the ratio. For example, the step 1033 can first calculate the dielectric value of the food ingredients from the ratio $S_{11}$ by the equation (1) below. The dielectric value is a complex value represented by $\varepsilon'-j\cdot\varepsilon''$, $\varepsilon'$ is the dielectric permittivity and $\in''$ is the loss factor.

$$\varepsilon' - j\cdot\varepsilon'' = \frac{\frac{(1-S_{11})}{(1+S_{11})\cdot Z_0 \cdot j \cdot 2\pi \cdot f} - C_p}{C_g} \quad (1)$$

Here, both $C_p$ and $C_g$ are capacitor constants of the source that generates electrical field applied to the food ingredients. Z0 is a constant for the cable line of the source. f is the given radio frequency. Then, the step 1033 can calculate the penetration depth d of the given radio frequency from the dielectric permittivity $\in'$, the loss factor $\in''$ and the ratio $S_{11}$ by the equation (2) below:

$$d = \frac{\sqrt{2}\cdot c}{2\pi \cdot f} \cdot \frac{1}{\sqrt{\sqrt{\varepsilon'^2 + \varepsilon''^2} - \varepsilon'}} \quad (2)$$

Here, c is light speed in vacuum, i.e. $3*10^8$ m/s. f is the given radio frequency.

including 105 the given radio frequency into the plurality of selected radio frequencies if the penetration depth of the electrical field having a radio frequency corresponding to the given radio frequency is equal to or larger than the thickness of the food ingredients in the direction of the electrical field applied to the food ingredients.

In this way, all the electrical fields that are applied to measure the spectrum of energy absorption of the food ingredients can pass through the food ingredient. As such, the energy absorbed by the food ingredients can be evenly distributed throughout the food ingredients.

Figure 8:
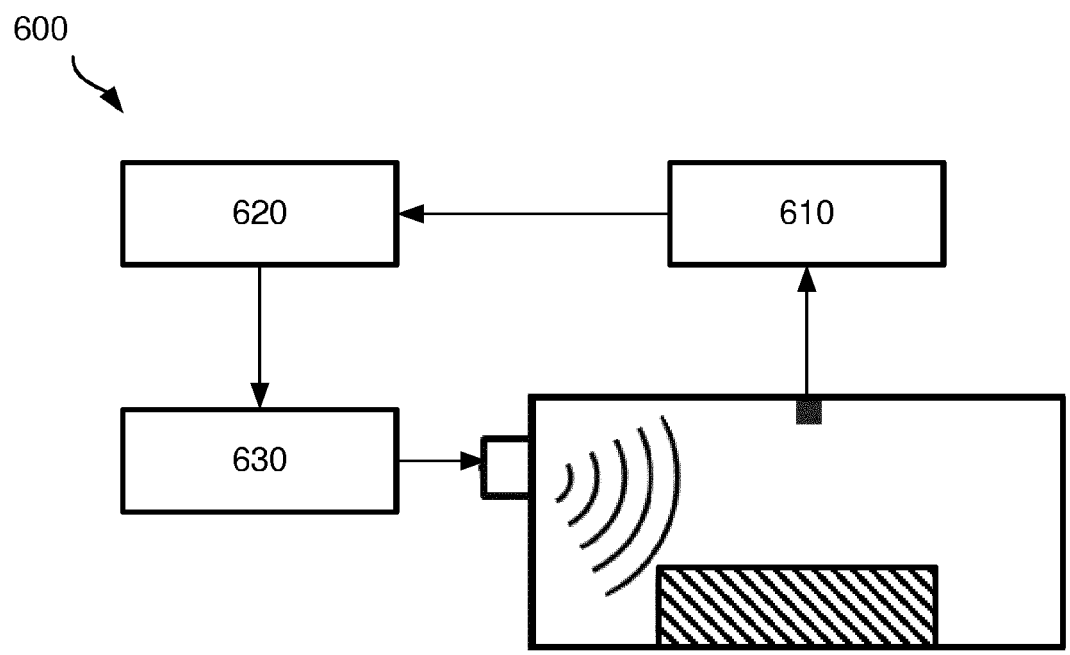
FIG. 8 is a block diagram of an apparatus configured to control the heating of food ingredients in accordance with an embodiment.

FIG. 8 is a block diagram of an apparatus 600 configured to control the heating of food ingredients in accordance with an embodiment. The apparatus 600 comprises various units to carry out the various steps of the method according to the invention described above. As shown, the apparatus 600 comprises the first unit 610, the second unit 620 and a third unit 630. Now the functions of the individual units will be described in detail with reference to FIG. 8.

The first unit 610 is adapted to measure the spectrum of energy absorption of the food ingredients in a given range of radio frequencies. The second unit 620 is adapted to identify, in the given range of radio frequencies, the radio frequency for which the food ingredients have the maximum energy absorption. The third unit 630 is adapted to apply an electrical field to the food ingredients. The electrical field has a radio frequency corresponding to the radio frequency for which the food ingredients have the maximum energy absorption.

By taking into account the energy absorption of the food ingredients for the radio frequency in the course of heating the food ingredients, the radio frequency for which the food ingredients have the maximum energy absorption is used to heat the food. In this way, the heating efficiency is improved, thereby reducing the heating time.

Preferably, the first unit 110 is further adapted, for a plurality of selected radio frequencies in the given range of radio frequencies, to apply an electrical field having a radio frequency corresponding to one of the plurality of selected radio frequencies on the food ingredients, and to measure the ratio between the energy of the radio frequency electrical field reflected from the food ingredients, and the energy of the radio frequency electrical field applied to the food ingredients. If the ratio is larger, it means that more energy of the radio frequency electrical field is reflected from the food ingredients, thus less energy is absorbed by the food ingredients.

Preferably, the first unit 110 is further adapted, for a plurality of selected radio frequencies in the given range of radio frequencies, to apply an electrical field having a radio frequency corresponding to one of the plurality of selected radio frequencies on the food ingredients, and to measure the ratio between the energy of the radio frequency electrical field absorbed by the food ingredients and the energy of the radio frequency electrical field applied to the food ingredients. In this case, the energy of the radio frequency electrical field absorbed by the food ingredients is, for example, equal to the energy of the radio frequency electrical field applied to the food ingredients minus the energy of the radio frequency electrical field reflected from the food ingredients. Hence, a larger ratio indicates that more energy is absorbed by the food ingredients.

Preferably, the second unit 620 is adapted to select, among a set of predefined radio frequencies, a radio frequency being closest to the radio frequency for which the food ingredients have the maximum energy absorption. For example, the predefined radio frequencies may correspond to authorized frequencies by a given Administration, Authority, or Standard. Also, the third unit 630 is adapted to apply an electrical field having a radio frequency corresponding to the selected predefined radio frequency for heating the food ingredients.

The present disclosure also relates to a computer readable storage medium storing instructions. When executed on an apparatus, such as apparatus 800, the instructions cause the apparatus to perform the various steps of the method as described above.

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method of controlling the heating of food ingredients, the method comprising the steps of:

measuring the spectrum of energy absorption of the food ingredients in a given range of radio frequencies;
identifying, in said given range of radio frequencies, the radio frequency for which the food ingredients have the maximum energy absorption; and
applying an electrical field to the food ingredients, said electrical field having a radio frequency corresponding to said radio frequency for which the food ingredients have the maximum energy absorption, wherein said step of measuring comprises, for a plurality of selected radio frequencies in said given range of radio frequencies, the steps of:

applying an electrical field on the food ingredients having a radio frequency corresponding to a given selected radio frequency in said plurality of selected radio frequencies; and,
measuring the ratio between the energy of the radio frequency electrical field reflected or absorbed from the food ingredients, and the energy of the radio frequency electrical field applied to the food ingredients, and wherein the plurality of selected radio frequencies are selected from said given range of radio frequencies by the steps of:

for each of said given range of radio frequencies, obtaining a penetration depth of an electrical field having a radio frequency corresponding to the given radio frequency into the food ingredients, and
including the given radio frequency into the plurality of selected radio frequencies if the penetration depth of the electrical field having a radio frequency corresponding to the given radio frequency is equal to or larger than the thickness of the food ingredients in the direction of the electrical field applied to the food ingredients.

2. The method of controlling as claimed in claim 1, wherein the ratio is quantified by scattering parameters.

3. The method of controlling as claimed in claim 1, wherein:

the step of identifying further comprises a step of selecting, among a set of predefined radio frequencies, the predefined radio frequency being closest to said radio frequency for which the food ingredients have the maximum energy absorption,
the step of applying comprises applying an electrical field having a radio frequency corresponding to said selected predefined radio frequency.

4. The method of controlling as claimed in claim 1, the step of obtaining the penetration depth of the candidate radio frequency further comprises the steps of:

applying an electrical field on the food ingredients having a radio frequency corresponding to the given radio frequency,
measuring the ratio between the energy of the electrical field reflected from the food ingredients, and the energy of the electrical field applied to the food ingredients,
deriving the penetration depth of the candidate radio frequency into the food from the ratio.

5. The method of controlling as claimed in claim 1, further comprising a step of sequentially repeating the steps.

6. An apparatus configured to control the heating of food ingredients, the apparatus comprising:

a first unit for measuring the spectrum of energy absorption of the food ingredients in a given range of radio frequencies;
a second unit for identifying, in said given range of radio frequencies, the radio frequency for which the food ingredients have the maximum energy absorption; and a third unit for applying an electrical field to the food ingredients, said electrical field having a radio frequency corresponding to said radio frequency for which the food ingredients have the maximum energy absorption, wherein said first unit is further adapted, for a plurality of selected radio frequencies in said given range of radio frequencies, to:

apply an electrical field on the food ingredients having a radio frequency corresponding to a given selected radio frequency in said plurality of selected radio frequencies; and, measure the ratio between the energy of the radio frequency electrical field reflected or absorbed from the food ingredients, and the energy of the radio frequency electrical field applied to the food ingredients, and wherein said first unit is adapted to select the plurality of radio frequencies from said given range of radio frequencies by:

for each of said given range of radio frequencies, obtaining a penetration depth of an electrical field having a radio frequency corresponding to the given radio frequency into the food ingredients, and including the given radio frequency into the plurality of selected radio frequencies if the penetration depth of the electrical field having a radio frequency corresponding to the given radio frequency is equal to or larger than the thickness of the food ingredients in the direction of the electrical field applied to the food ingredients.

7. The apparatus as claimed in claim 6, wherein:

the second unit is further adapted to select, among a set of predefined radio frequencies, the predefined radio frequency being closest to said radio frequency for which the food ingredients have the maximum energy absorption, the third unit is further adapted to apply an electrical field having a radio frequency corresponding to said selected predefined radio frequency.

8. A cooking device comprising an apparatus configured to control a heating process of food according to claim 6.

9. A computer readable storage medium storing instructions which, when executed on an apparatus, cause the apparatus to perform the steps of the method according to claim 1.

* * * * *